United States Patent [19]
Weglarz et al.

[11] Patent Number: 5,003,952
[45] Date of Patent: Apr. 2, 1991

[54] SEQUENTIAL VARIABLE FUEL INJECTION

[75] Inventors: Michael W. Weglarz, Utica, Mich.; Michael T. Vincent, Sterling, Mass.; James F. Prestel, Rochester; Paul G. Sisoler, Warren, both of Mich.

[73] Assignee: Chrysler Corporation, Highland Park, Mich.

[21] Appl. No.: 523,094

[22] Filed: May 14, 1990

[51] Int. Cl.$^5$ .............................................. F02D 41/04
[52] U.S. Cl. ........................................................... 123/478
[58] Field of Search ............... 123/476, 478, 480, 486, 123/488, 490, 492, 493, 494

[56] References Cited

U.S. PATENT DOCUMENTS

| | | |
|---|---|---|
| 3,990,412 | 11/1976 | Zechnall et al. ............... 123/478 |
| 4,109,616 | 8/1978 | Zechnall et al. ............... 123/478 |
| 4,383,515 | 5/1983 | Higashiyama et al. ......... 123/478 X |
| 4,535,743 | 8/1985 | Igashira et al. ............... 123/478 X |
| 4,562,817 | 1/1986 | Ito ............................. 123/478 |
| 4,602,603 | 7/1986 | Honkanen et al. ............ 123/416 |
| 4,697,568 | 10/1987 | Yasuoka ....................... 123/478 X |
| 4,796,591 | 1/1989 | Kiyono et al. ................ 123/492 |

*Primary Examiner*—Willis R. Wolfe
*Attorney, Agent, or Firm*—Mark P. Calcaterra

[57] ABSTRACT

The present invention is a method for use in a fuel control system for an engine equipped with fuel injectors, where the time when a fuel injector is fired to fuel its cylinder, relative to the cylinder's valve events, may be varied to enable better fuel preparation corresponding to the various engine operating conditions.

1 Claim, 6 Drawing Sheets

SEQUENTIAL VARIABLE FUEL INJECTION

BACKGROUND OF THE INVENTION

1. Field of the Invention

The present invention relates generally to fuel injection for engines of automotive vehicles, and more particularly to electronic control of the firing of fuel injectors on an engine for an automotive vehicle.

2. Description of Related Art

Typically, an engine of an automotive vehicle has one or more fuel injectors for delivering fuel from a fuel source to cylinders of an internal combustion engine. Generally, a sensor on a distributor of the engine transmits a signal from the distributor as to the crank angle of the engine. This distributor reference signal is received by an electronic control unit (ECU) which outputs a signal to fire the fuel injectors at predetermined states of the distributor reference signal.

Currently, multi-port fuel injection systems consist of either "grouped" or "banked" fuel injector firings (e.g., injectors fired in pairs two at a time) or sequential fuel injector firings (e.g., injectors fired sequentially one at a time) Both of these systems typically utilize the distributor reference signal to synchronize the firing of the fuel injectors with the engine's valve events. The time when a cylinder's fuel injector is fired relative to that cylinder's valve event is constant for every firing of that fuel injector.

In normal sequential fuel injector timing, each cylinder is fired in a sequential order. However, a need exists to vary the time when a fuel injector is fired to fuel a cylinder, relative to that cylinder's valve events. For example, during engine idle conditions it may be desired to inject fuel into the cylinder when an intake valve is open, while during engine acceleration conditions, it may be desired to inject fuel into the cylinder well before the intake valve opens to obtain the best fuel preparation.

SUMMARY OF THE INVENTION

It is therefore, one object of the present invention to provide a method of firing fuel injectors for an engine of an automotive vehicle for sequential fuel injection.

It is another object of the present invention to vary the time of firing fuel injectors for sequential fuel injection.

To achieve the foregoing objects, the present invention is a method of firing fuel injectors for an engine of an automotive vehicle. The method includes the steps of calculating a desired total injector on time for current engine conditions. The method also includes calculating a variable injection time (VIT) and a turn on time based on the VIT. The method further includes firing the fuel injectors at the calculated turn on time for the calculated total injector on time.

One advantage of the present invention is that a variable injector timing (VIT) value can be chosen to be any value from zero (0) to seven hundred twenty (720) degrees crank angle relative to the respective cylinder's intake valve opening. This enables the fuel injectors to be fired at any point over the four engine cycles (intake, compression, power, and exhaust) of a four cycle engine. The VIT value for each of the cylinders can be chosen so that a value of zero degrees falls on the last possible reference pick-up edge of the distributor reference signal in the open intake valve for that cylinder. The maximum VIT value of seven hundred twenty degrees was then at the same reference pick-up edge seven hundred twenty degrees prior to the zero degree edge. Thus, the zero degree VIT point for one cylinder range is the seven hundred twenty degree point of the next successive range for that cylinder.

Another advantage of the present invention is bi-modal fuel injection timing. Bi-modal fuel injection timing uses the VIT strategy described above, except for how the actual VIT value is calculated. Instead of the VIT being a fully variable value, the VIT value is obtained directly from one of two constants depending on the position of the throttle. When the throttle is in the closed position, the closed throttle VIT value is used, and when the throttle is in the open position, the open throttle VIT value is used.

Yet another advantage of the present invention is that a slight variation of the bi-modal VIT value calculation works well with control systems that are limited in the amount of time that can be spent calculating the VIT value or that do not have a good method of firing the fuel injectors at any time. Instead of calculating a fuel injector firing start time from the bi-modal VIT values, the bi-modal VIT values are just pointers to which reference pick-up edge the fuel injectors should be firing off of (i.e. either the open intake valve edge or the closed intake valve edge). As a result, little time is required and the injectors are always fired off of a reference pick-up edge.

Other objects, features and advantages of the present invention will be readily appreciated as the same becomes better understood from the following description and the accompanying drawings.

DESCRIPTION OF THE PREFERRED EMBODIMENT(S)

Figure 6:
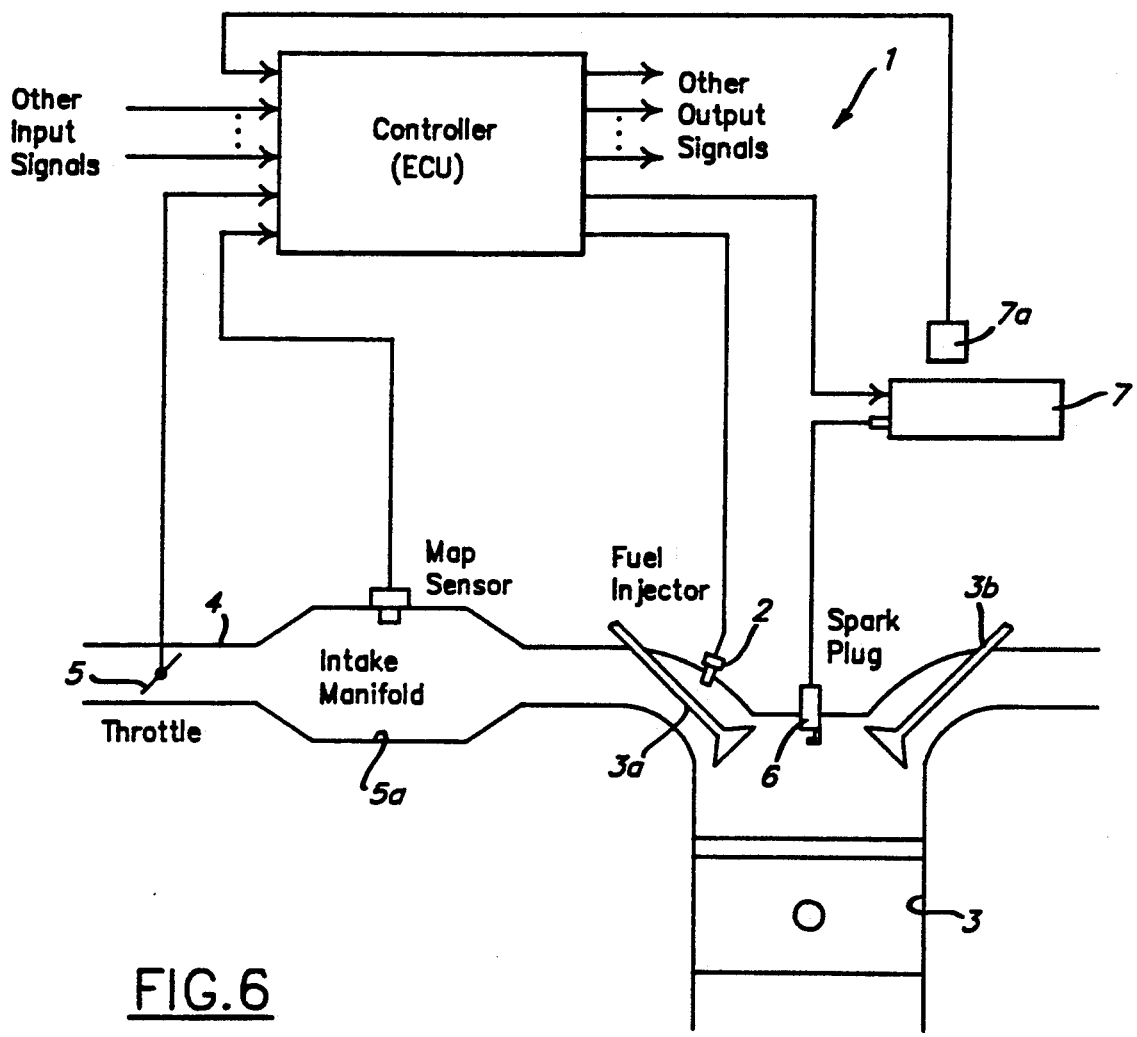
FIG. 6 is a schematic view of a fuel injection system incorporating the present invention.

Referring to FIG. 6, a schematic view of a fuel injection system 1 is shown for an automotive vehicle (not shown). Under normal operating conditions, fuel is delivered from a fuel source (not shown) through fuel lines (not shown) to at least one fuel injector or actuator 2. The fuel injector 2 is conventional and injects fuel from fuel lines into at least one individual cylinder 3 of an internal combustion engine of the automotive vehicle. In the preferred embodiment, the engine has four cylinders 3 and four fuel injectors 2, one fuel injector 2 for each cylinder 3. The cylinder 3 also has an intake valve 3a and an exhaust valve 3b which are conventional. The fuel injection system 1 also includes a throttle body 4 having a throttle valve 5. The throttle valve 5 is opened closed or at a position therebetween for allowing or preventing air to enter an intake manifold 5a and flow to the cylinders 3 of the engine. Fuel from the fuel injectors 2 is mixed with air in the cylinders 3 in a known manner.

The fuel injection system 1 further includes a spark plug 6 for each cylinder 3 of the engine. The spark plug 6 is connected by a plug wire to a distributor 7. The distributor 7 sends an electrical signal to the spark plugs 6 to ignite the fuel and air mixture in the cylinders 3 at predetermined time intervals. A sensor 7a, such as a Hall-Effect sensor is located near the distributor 7. An example of such a sensor and distributor may be found in U.S. Pat. No. 4,602,603 issued July 29, 1986, to Honkanen et al. and assigned to the same assignee as the present invention, the disclosed material of which is hereby incorporated by reference.

The sensor 7a and distributor 7 are electrically connected to an electronic control unit (ECU) 8, including memory which receives a pickup or distributor reference signal of the crank angle or position of the engine. The ECU 8 outputs a signal to the distributor 7 to fire the spark plugs 6 The fuel injectors 2 are also electrically connected to the ECU 8 which outputs a signal to fire the fuel injectors 2. The fuel injectors 2 are fired sequentially, e.g. one at a time, for sequential fuel injection. The ECU 8 interfaces with several other transducers or sensors which monitor various engine parameters such as the engine temperature (TMP), engine speed (RPM), engine manifold absolute pressure (MAP), etc.

Figure 1:
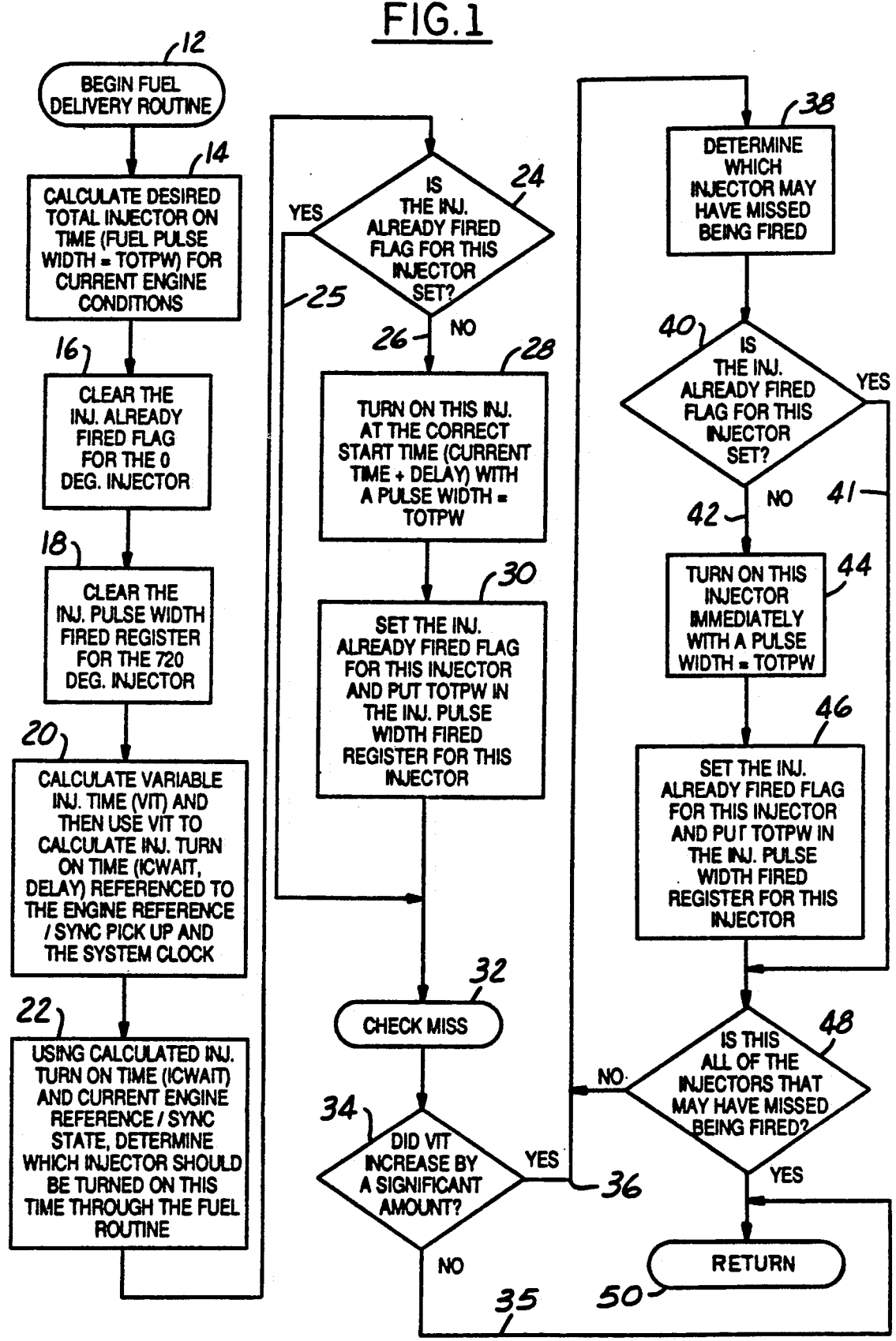
FIG. 1 is a flowchart of a method of firing fuel injectors according to the present invention.

Referring to FIG. 1, a flowchart for a method of firing at least two or more fuel injectors for sequential fuel injection according to the present invention is shown. The methodology enters through bubble 12 to begin the fuel delivering routine at the occurrence of a reference pick-up edge of the distributor reference signal and falls through to block 14. In block 14, the methodology calculates a desired total fuel injector "ON" time or pulse width (TOTPW) for current engine operating conditions. The ECU 8 calculates TOTPW from values provided by the sensors or transducers monitoring the engine operating conditions such as the engine temperature, the engine RPM, the engine MAP, etc. The calculated desired total fuel injector pulse width value is then stored by the ECU 8 in memory for further use. The methodology then proceeds to block 16.

In block 16, the methodology clears or resets an injector already fired indicator or flag for a zero (0) degree fuel injector. The zero degree fuel injector is that fuel injector 2 which corresponds to the cylinder 3 whose open intake valve 3a entertains the last possible reference pick-up edge of the distributor reference signal. It should be appreciated that the zero degree fuel injector may be arbitrarily chosen.

Once the injector already fired flag is cleared for the zero degree fuel injector, the methodology falls through to block 18 and clears or resets an injector pulse width fired register for a seven hundred twenty (720) degree fuel injector. The injector pulse width fired register indicates the length of the last pulse width fired by the seven hundred twenty fuel injector. The methodology then proceeds to block 20.

At block 20, the methodology calculates a variable injection time (VIT) for the fuel injector 2. The methodology then uses the calculated VIT value to calculate an injector turn on time (ICWAIT and DELAY) referenced to the engine reference/synchronization pick-up or distributor reference signal and an internal clock of the ECU 8. The ECU 8 performs this calculation by multiplying the ignition period value by the number of cylinders 3 and then subtracting the VIT value. If the end of the injector pulse width timing is being controlled instead of the beginning, the total fuel injector pulse width is also subtracted. Next, the methodology advances to block 22.

The VIT value is calculated off a timing or distributor reference signal so that the most current ignition period, (the time between consecutive, similar reference pick-up edges) engine speed (RPM), manifold absolute pressure (MAP), throttle position and total injector fuel pulse width (TOTPW) data is used in the calculation. It should be appreciated the VIT value is calculated by the ECU 8 using a table interpolation, mathematical equation, or some other method involving the use of engine data.

The fuel injector turn on time can now be loaded into a timer of the ECU 8 to trigger the firing of the appropriate fuel injector 2. However, this may introduce significant error, since the engine parameters can change vastly before the fuel injector 2 is ever fired (possibly up to four ignition periods from the current reference pick-up edge). The fuel injector turn on time is instead converted into two separate values, ICWAIT and DELAY. ICWAIT is the quotient and DELAY is the remainder of the fuel injector turn on time divided by the ignition period. From ICWAIT and the current state of the reference/synchronization pick-ups (e.g., a cylinder counter) the fuel injector that is to be fired within one ignition period from the current reference pick-up edge is determined. Then, if this fuel injector has not already been fired, it is fired at a DELAY time from the current pick-up edge By performing the VIT value calculation every falling edge of the distributor reference pick-up signal and converting it to an ICWAIT and DELAY values, the fuel injector turn on time calculation error is reduced to the error induced by the changes in engine parameters over only one ignition period.

At block 22 the methodology uses the calculated fuel injector turn on time (ICWAIT) and the current engine reference/synchronization pick-up state to determine which fuel injector is to be turned on this time through the fuel delivery routine. The methodology then falls through to decision block 24.

At decision block 24, the methodology determines whether the fuel injector already fired flag for the fuel injector to be turned on has already been set. If the fuel injector already fired flag has been set, the methodology proceeds via path 25 to bubble 32 and begins to check for a fuel injector 2 that missed firing as will be discussed further subsequently herein. In decision block 24, if the injector already fired flag has not been set, the methodology proceeds to block 28 by way of path 26. In block 28, the methodology or ECU 8 turns the fuel injector 2 on at the correct starting time (CURRENT TIME+DELAY) for a time equal to the calculated total fuel injection pulse width (TOTPW). Continuing on into block 30, the methodology then sets the injector already fired flag for the fired fuel injector and loads the calculated total fuel injection pulse width (TOTPW) into the injector pulse width fired register for the fired fuel injector. Proceeding to oval 32, the methodology checks to see that the fuel injectors 2 have fired. The methodology then advances to decision block 34.

At decision block 34, the methodology determines whether the variable injection timing (VIT) has increased by a predetermined amount. As the VIT value increases the ICWAIT value decreases which in turn, decreases the fuel injector turn on time. If the fuel injector turn on time is decreased enough, a fuel injector will miss firing. This is more fully discussed in connection with FIGS. 3 and 4 to be described. A fuel injector missing its firing time is directly related to an increase in VIT value. If the VIT value has not increased by a predetermined amount in decision block 34, the methodology determines or concludes that all fuel injectors 2 have fired and the methodology proceeds via path 35 to bubble 50. At bubble 50, the methodology returns.

Returning to decision block 34, if the VIT value has increased by a predetermined amount, the methodology proceeds by way of path 36 to block 38. In block 38, the methodology determines which fuel injector may have missed being fired. The methodology then advances to decision block 40. In decision block 40, the methodology checks whether the injector already fired flag, of the possibly missed fuel injector has been set. If the injector already fired flag has been set for this fuel injector, the methodology proceeds to decision block 48 via path 41. If the injector already fired flag has not been set, meaning that the fuel injector has missed being fired the methodology falls through to block 44 along path 42.

In block 44, the methodology or ECU 8 immediately turns on the missed fuel injector with a pulse width equal to the total calculated fuel injector pulse width (TOTPW). Once the missed fuel injector is fired, the methodology advances to block 46 and sets its fuel injector already fired flag and its pulse width length is stored in the appropriate fuel injection pulse width fired register. The methodology then falls through to decision block 48.

In decision block 48, the methodology then determines if all of the fuel injectors that may have missed being fired have subsequently been updated and fired. If they have not, the methodology then proceeds back to block 38 previously described. If all of the fuel injectors that may have missed being fired have subsequently been fired, the methodology advances to bubble 50 and returns.

Figure 2:
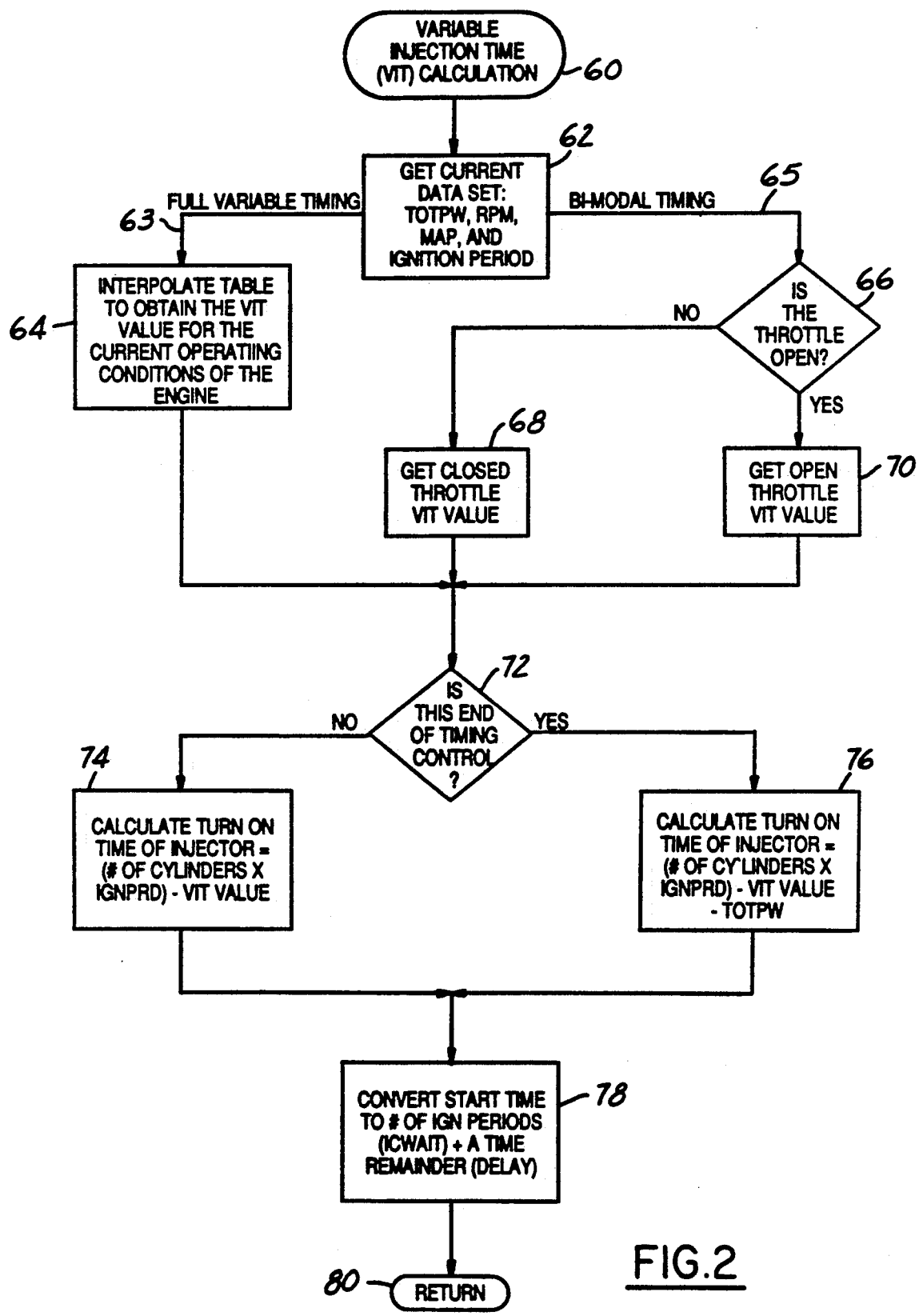
FIG. 2 is a flowchart showing the calculation of sequential variable fuel injection time for the method of FIG. 1.

Referring to FIG. 2, a flowchart of the methodology for calculating the variable injection timing (VIT) of block 20 for the fuel delivery routine of FIG. 1 is shown. The methodology enters through bubble 60 and falls through to block 62.

In block 62, the methodology retrieves the current engine operating parameters, including engine RPM, engine MAP, ignition period and the total calculated fuel injection pulse width (TOTPW). Also in block 62, the ECU 8 determines whether full variable fuel injection timing or bi-modal fuel injection timing is to be calculated based on the current engine operating parameters. If full variable fuel injection timing is to be calculated, the methodology proceeds to block 64. In block 64, the methodology, based upon the current operating conditions of the engine, obtains the VIT value using an interpolation table. The methodology then advances to decision block 72 to be described.

Returning to block 62, if bi-modal fuel injection timing is to be calculated, the methodology advances to decision block 66. In decision block 66, the methodology determines whether the engine parameters require mode #1 VIT timing. The ECU 8 accomplishes this by determining whether the throttle of the engine is open. If the throttle is open, the methodology advances to block 70 and obtains an open throttle bi-modal or mode #2 VIT value. If the throttle is not open, the methodology advances to block 68 and obtains a closed throttle bi-modal or mode #1 VIT value. Upon leaving either block 68 or block 70, the methodology advances to decision block 72.

In decision block 72, the methodology determines whether it is the end of timing control for variable end of injection timing (more fully discussed in FIG. 3) or variable start of injection timing (more fully discussed in FIG. 4) which is to be calculated. Variable end of injection timing uses a VIT value that is referenced off of the end of the calculated total fuel injection pulse width to calculate the injector turn on time, while variable start of injection timing uses a VIT value referenced off of the start of the calculated total fuel injection pulse width to calculate the injector turn on time, hence the respective names.

If variable end of injection timing is to be used, the time that the fuel injector is to be turned on is calculated in block 76 by multiplying the number of cylinders contained in the engine by the ignition period and then subtracting the VIT value and the total fuel injection pulse width. The method then falls through to block 78.

If variable end of injection timing is not to be used, in other words, variable start of injection timing is to be used, the time at which the fuel injector is to be turned on is calculated in block 74 by multiplying the number of engine cylinders by the ignition period and then subtracting the VIT value. The method then falls through to block 78.

The fuel injector start or turn on time calculated in either block 74 or block 76 is then converted in block 78 into a number of ignition periods, ICWAIT, and a time remainder DELAY, as previously described. This is accomplished by dividing the fuel injector start or turn on time by the ignition period. The methodology is then passed to bubble 80 where it returns or is released from the VIT calculation algorithm.

Figure 3:
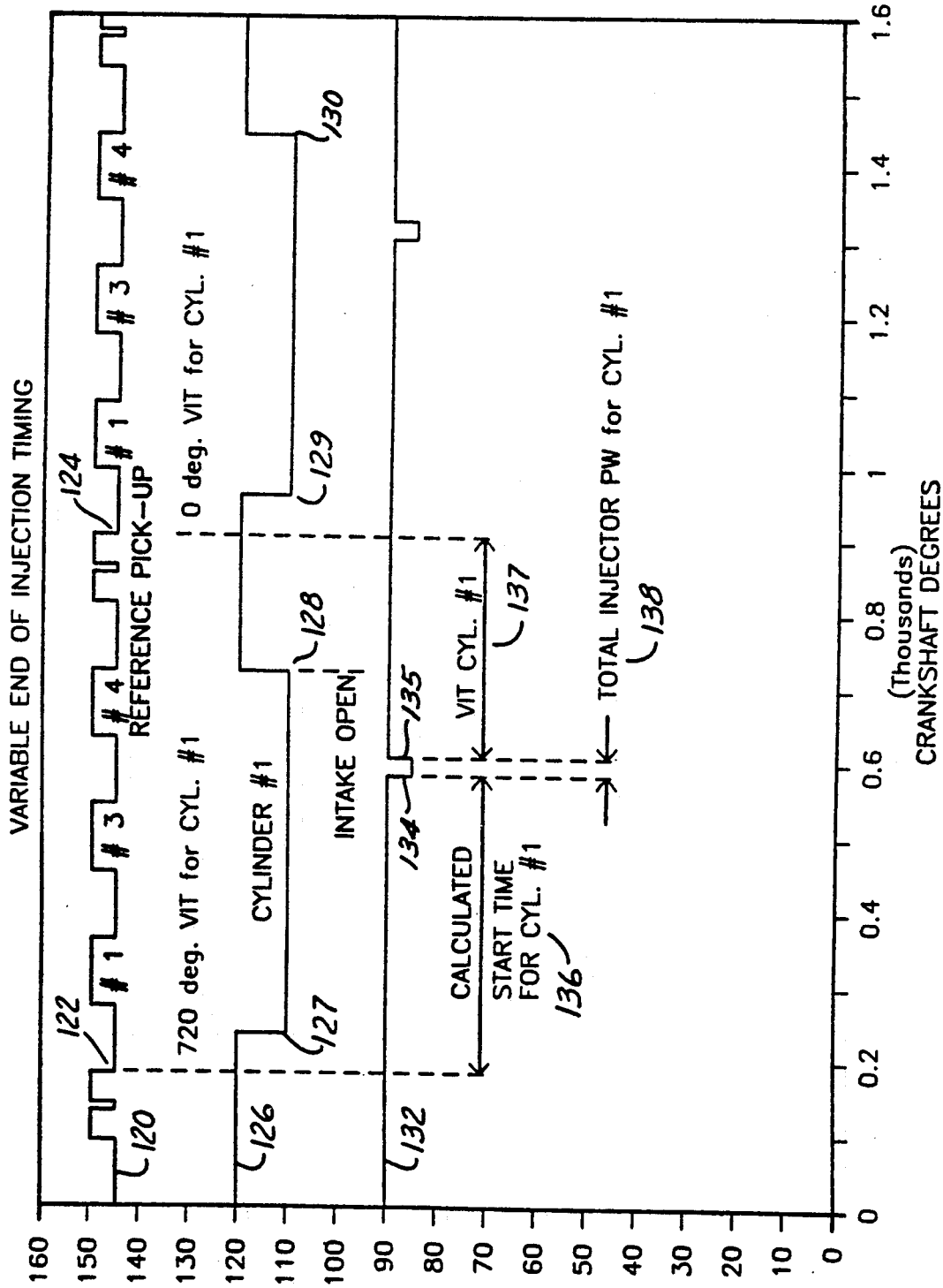
FIG. 3 is a graph illustrating a reference timing signal, an injector timing signal, and timing points for how the VIT values relate to end of injection timing control applied to a four cylinder engine.

FIG. 3 is a graph illustrating various aspects of sequential variable fuel injection timing and, more particularly, the calculation of the starting or turn on time for the fueling of a cylinder 3 when the VIT value is referenced from the end of the calculated total fuel injector pulse width for one cylinder of a four cylinder engine. Line 120 represents the distributor reference signal used to synchronize the firing of the fuel injectors 2 with the engine's valve events. Point 124 of line 120 is the arbitrarily chosen zero (0) degree reference point and point 122 is the arbitrarily chosen seven hundred twenty (720) degree reference point for the cylinder #1 injector. Note that the 0 degree and the 720 degree reference points are actually the same point as far as the reference signal is concerned. However, the 0 degree and 720 degree points are not the same points in time. The 720 degree reference point is the 0 degree reference point for the following 720 degree cycle. Line 126 is a schematic representation showing the occurrence of the intake valve events of cylinder #1. Points 127 and 129 of line 126 indicate cylinder #1 intake valve closing events and points 128 and 130 of line 126 indicate cylinder #1 intake valve opening events.

Line 132 is a schematic representation showing the firing of the cylinder #1 injector. Point 134 indicates the injector turn on event and point 135 indicates the injector turn off event. Dimension 137 is the calculated VIT value as described in FIG. 2. Note that the VIT value is defined as being measured from the end of the 720 degree range to the fuel injection pulse and not from the start of the 720 degree range. This may be chosen simply for convenience. It should be appreciated that the VIT value could have been defined from the start of the 720 degree range to the fuel injection pulse. Dimension 138 is the total injector pulse width (TOTPW) for cylinder #1 as described in FIG. 1. The start time for the firing of the fuel injector of that cylinder is calculated by multiplying the number of cylinders 3 in the engine (in this case 4) by the ignition period and then subtracting both the VIT value and the total fuel injection pulse width. This is shown as dimension 136.

Figure 4:
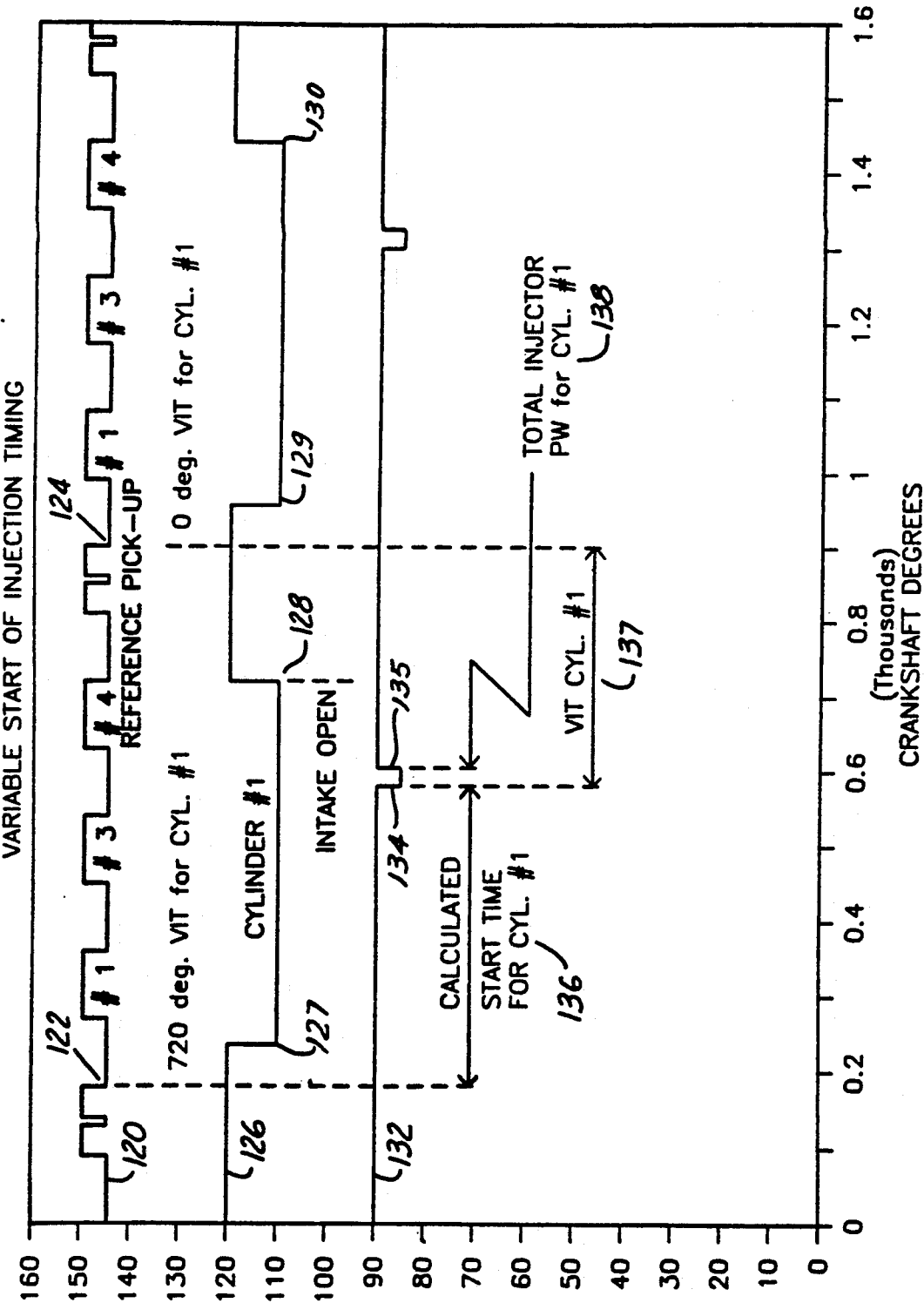
FIG. 4 is a graph illustrating a reference timing signal, an injector timing signal, and timing points for how the VIT values relate to start of injection timing control applied to a four cylinder engine.

FIG. 4 is also a graph illustrating the various aspects of sequential variable fuel injection timing. It differs from FIG. 3 in that the calculation of the start time for the firing of the fuel injector is for when the VIT value is referenced to the start of the calculated total fuel injection pulse width (TOTPW) and not the end. In this manner, the start time for the firing of the fuel injectors 2 is calculated by multiplying the number of cylinders 3 by the ignition period and then subtracting the VIT value. Dimensions 136 and 137 of FIG. 4 are shown to reflect referencing the VIT value to the start of the TOTPW.

Figure 5:
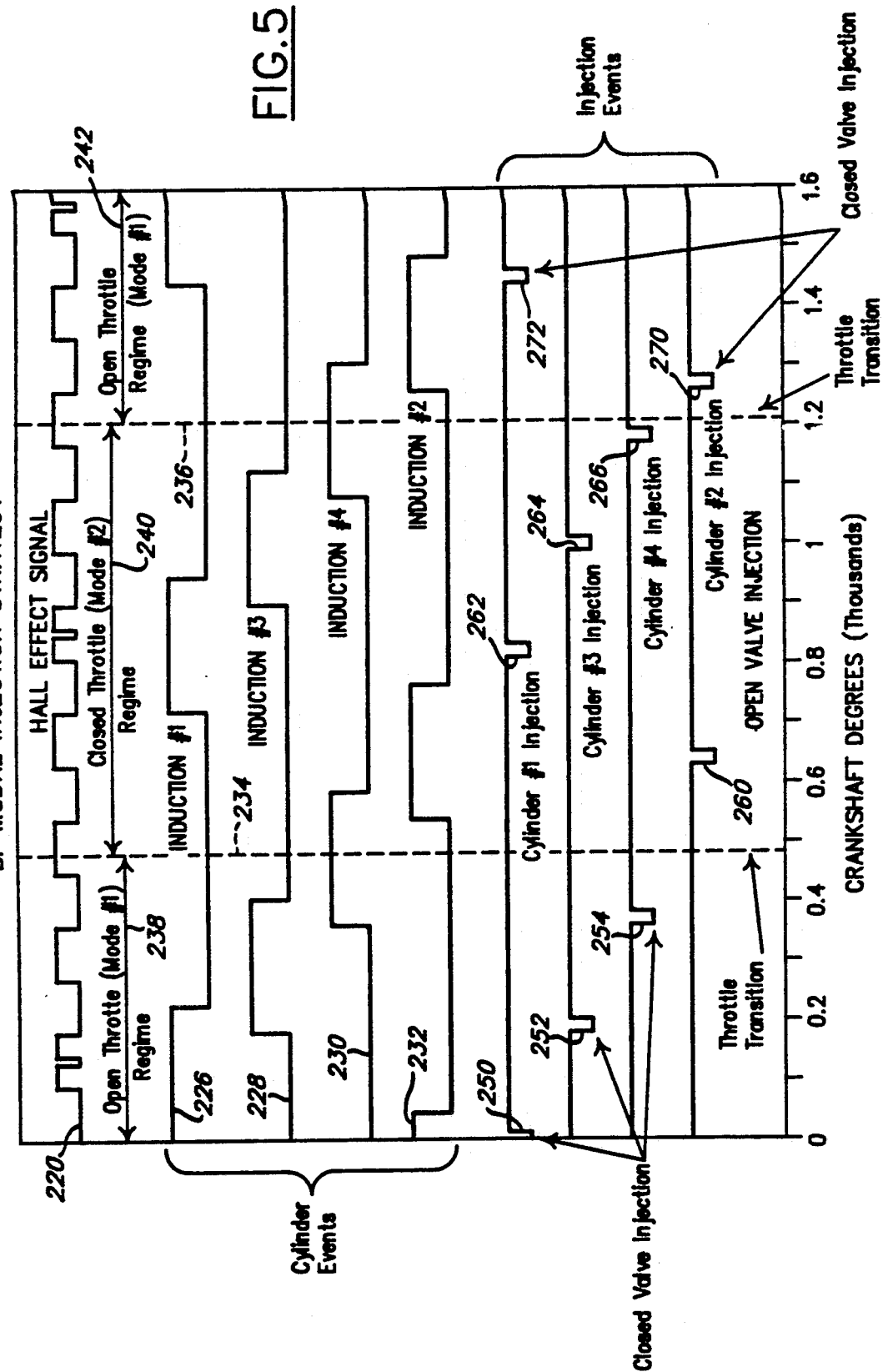
FIG. 5 is a graph illustrating the bi-modal VIT strategy using throttle position as the VIT mode controller applied to a four cylinder engine.

FIG. 5 is a graph illustrating the aspects of the bi-modal VIT strategy, with throttle position as the VIT mode controller. Line 220 represents the distributor reference signal used to synchronize the firing of the fuel injectors with the engine's valve events. Lines 226, 228, 230, and 232 are the schematic representations showing the occurrences of the intake valve events for cylinder #1, cylinder #3, cylinder #4, and cylinder #2. It should be appreciated that the firing order of this particular engine is 1, 3, 4, 2.

In the first regime (shown by dimension 238), the throttle is in an open position. The ECU 8 determines the VIT value to be the mode #1 value and uses this value to determine the turn on time for all the firings of the fuel injectors 2 when operating within this regime. It should be appreciated that for each injector fired in the mode #1 regime, the fuel injector pulse widths (points 250, 252, and 254) all start on the falling edge of the distributor reference signal (line 220) occurring at the respective cylinder's intake valve opening event. This falling edge timing point is the arbitrarily chosen mode #1 VIT point.

At the time when the throttle closes (line 234), the ECU 8 determines the VIT value to be the mode #2 value and uses this value to determine the turn on time for the fuel injectors 2 when operating in the closed throttle, mode #2, regime (shown as dimension 240). In the mode #2 regime, all fuel injector firings (points 260, 262, 264 and 266) all start on the first rising edge of the distributor reference signal (line 220) within the respective cylinder's open valve event. The first rising edge within a cylinder's open valve event is the arbitrarily chosen mode #2 VIT point.

The state of the throttle position then changes from closed to open (mode #2 to mode #1) at line 236. The ECU 8 now determines the VIT value to be the mode #1 value (the falling edge occurring at the respective cylinder's intake valve opening event) and all subsequent fuel injector firings (points 270 and 272) occur at the mode #1 VIT points.

Accordingly, the bi-modal VIT strategy of the present invention uses the VIT strategy described earlier, except for how the VIT values are calculated. Instead of the VIT value being fully variable and calculated by means of a table interpolation or mathematical equation the VIT value is obtained directly from one of two constants. The current engine operating parameters determine which constant is used. Then, from this VIT value, the time to fire the fuel injector is calculated and the injector is fired at the appropriate time. For example, say that the VIT value is dependent only on whether the engine is operating at open or closed throttle. Then, if the system determines that the throttle is closed, the closed throttle VIT value is used. If the system determines that the throttle is open, then the open throttle VIT value is used. As a result, bi-modal variable injection according to the present invention permits two different timing points for achieving a compromise between idle quality and off-idle emissions.

The present invention has been described in an illustrative manner It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. In a fuel injection system for an engine of an automotive vehicle including a plurality of cylinders, a spark plug for each of the plurality of cylinders, a distributor electrically connected to the spark plug, a throttle body having a throttle valve connected to the engine to allow or prevent air to the plurality of cylinders, a fuel source at least one fuel line connected to the fuel source, a plurality of fuel injectors connected to the fuel line for delivering fuel to the plurality of cylinders, a sensor located near the distributor for sensing predetermined states of the distributor, and an electronic control unit (ECU) electrically connected to the sensor, distributor and fuel injectors for receiving signals from the sensor and outputting signals to fire the distributor and fuel injectors, a method of firing the fuel injectors, said method comprising the steps of:

calculating a desired total injector on time for current engine conditions;

calculating a variable injection time (VIT) and a turn on time based on the VIT; and firing the fuel injectors at the calculated turn on time for the calculated total injector on time.

* * * * *